United States Patent Office 3,464,525
Patented Sept. 2, 1969

3,464,525
BRAKE ADJUSTER MECHANISMS
Charles Newstead, Tyseley, Birmingham, England, assignor to Girling Limited, Tyseley, Birmingham, England
Filed Sept. 5, 1967, Ser. No. 665,523
Int. Cl. F16d 51/68, 65/52
U.S. Cl. 188—79.5      8 Claims

ABSTRACT OF THE DISCLOSURE

The invention relates to automatic adjusters for drum brakes of the type having a manually rotatable adjuster spindle. The adjuster has a pawl and ratchet drive of which the ratchet wheel is keyed to the adjuster spindle for rotation therewith in both directions. Means are provided for limiting adjustment during autoadjustment by disengaging the pawl and ratchet, and the same means or further means unload the pawl during manual adjustment in opposition to the pawl. The arrangements described are all capable of fitting to existing brakes so as to convert a manually adjustable brake to one having manual and autoadjustment.

---

This invention provides a novel automatic drive mechanism for vehicle drum brake adjusters including an adjuster spindle having a fixed axis of rotation and which protrudes or is accessible through the brake backplate so as to be accessible for manual rotation.

In one prior proposal, automatic adjustment is effected through a pawl and ratchet wheel, the spindle of which is screw threaded into the adjuster. This arrangement has the disadvantage that the pawl is loaded against frictional forces imposed by the shoe return springs during manual resetting of the brakes.

In another proposal, an alternative form of unidirectional drive means has its driven member normally keyed to the adjuster spindle, but must be uncoupled from the spindle before manual adjustment can be effected.

The present invention aims to overcome these disadvantages. Also, in both prior proposals mentioned above, the adjuster mechanisms and brake structure, must be designed to suit each other and assembled during initial manufacture of the brake, whereas an adjuster mechanism in accordance with the present invention may readily be designed so that it can be fitted to an existing brake.

In accordance with the invention there is provided an automatic adjuster mechanism for a vehicle drum brake having a manually rotatable adjuster spindle, the mechanism including sensor means adapted to be mounted on a vehicle brake structure so as to produce a mechanical output in accordance with movement of a brake shoe, a converter unit adapted to be mounted on the brake structure and coupled to the spindle, and drive means operatively connecting the sensor means and converter unit, wherein the converter unit includes unidirectional drive means having a driven rotary member adapted to be keyed to the adjuster spindle for rotation therewith in both directions, and means for disengaging the unidirectional drive means to facilitate manual rotation of the adjuster spindle.

For the sake of simplicity, it is preferred to employ a pawl and ratchet wheel, the latter being keyed directly to the adjuster spindle, and means being provided to effect disengagement of the pawl from the ratchet to facilitate manual rotation of the adjuster spindle.

Some forms of automatic drive mechanism in accordance with the invention will now be described, by way of example only, with reference to the accompanying drawings, in which.

In the drawings corresponding parts of different embodiments are indicated by the same reference numerals.

Figure 1:
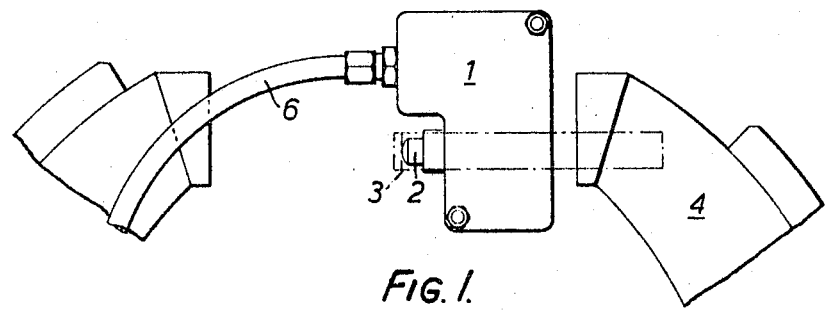
FIGURES 1 and 2 show a sensor unit and a converter unit, respectively, each in association with selected key parts of a conventional drum brake structure.
Figure 2:
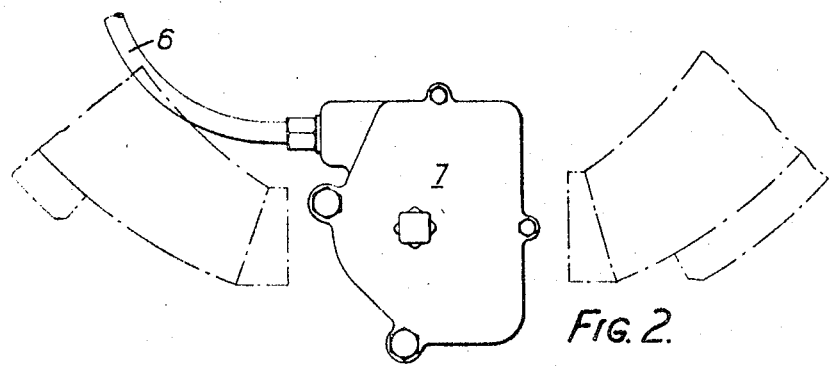

As indicated schematically in FIGURES 1 and 2, the drive mechanism comprises a sensor unit 1 having a strut or plunger 2 engageable in use by a bracket 3 attached to a brake shoe 4. Movement of the shoe 4 on braking displaces the plunger 2, and the sensor unit produces a mechanical output represented by displacement of a cable drive means 6 of the type having an inner core which is longitudinally movable inside an armoured, inextensible sheath. The sensor unit is positioned on the front side of the brake back plate, and the cable 6 passes through the back plate to the converter unit 7, which is mounted on the rear side of the backplate adjacent the adjuster spindle.

The converter unit is constructed and arranged to convert linear motion transmitted by the cable into a rotary motion, which is applied to the adjuster spindle.

It should be noted that the sensor and converter units can each be fitted to an existing brake, each by two bolts. Also, the bracket 3 is attached to one brake shoe by two bolts or screws. The adaption of an existing brake, having only manual adjustment, to receive the mechanism is therefore quite simple.

Figure 3:
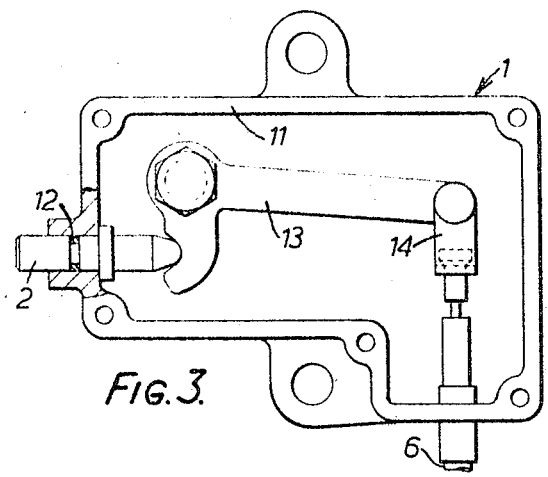
FIGURE 3 shows one form of sensor unit in elevation.

The present sensor unit shown in FIGURE 3 comprises a housing 11 through which the plunger 2 is slidable, the plunger having an annular seal 12. At its inner end, the plunger engages the shorter arm of a bell crank lever 13, whose longer arm is attached, by means of a pivoted link 14 to the core of the cable 6. The bell crank lever 13 is so proportioned that the displacement of the cable is, say 3 or 4 times greater than that of the plunger 2. The housing 11 is closed by a gasket, so that it can be completely sealed and does not require lubrication or cleaning after installation.

It will be understood that the internal mechanism of the sensor unit could take many different forms, but that described above is preferred for its simplicity and economy.

Figure 4:
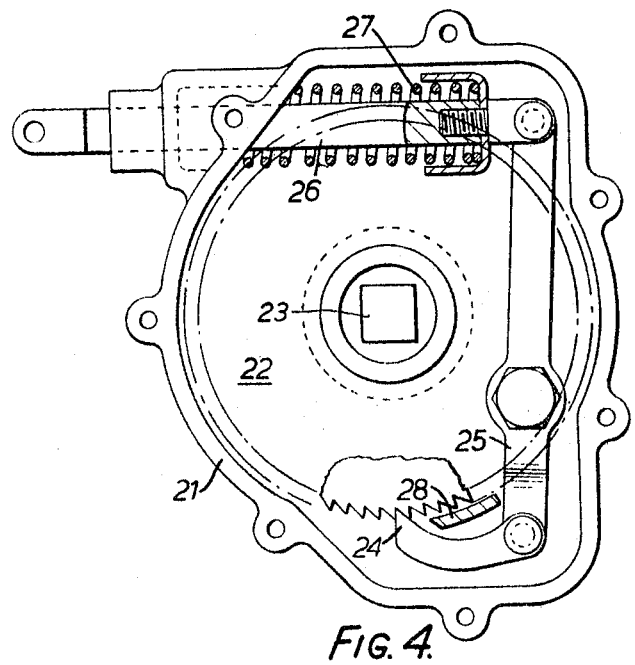
FIGURE 4 shows one form of converter unit in elevation.
Figure 5:
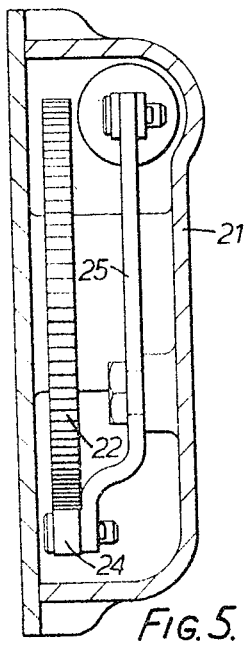
FIGURES 5 and 6 are sectional views of the unit of FIGURE 4.
Figure 6:
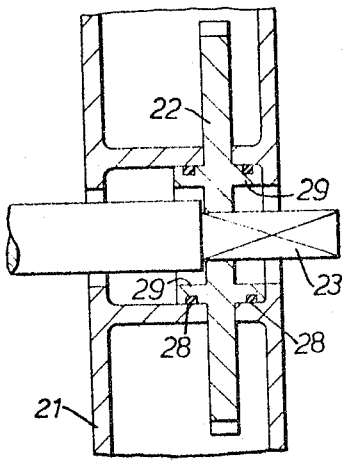

The converter unit shown in FIGURES 4 to 6 comprises a housing 21 in which is journalled a ratchet wheel 22 having a square central hole which receives the usual squared end on a conventional adjuster spindle 23. The ratchet wheel cooperates with a pawl 24 pivotally mounted at one end of a lever 25, the opposite end of which is attached to the cable 6 by means of a pull rod 26. A coil compression spring 27 biasses the parts to their illustrated (normal) positions. An abutment in the form of a ramp 28 is positioned near to pawl 24, so as to be engaged by it in the circumstances described below. The unit is sealed by a pair of annular seals 28 mounted in flanges 29 formed on the ratchet wheel, so that like the sensor unit, the converter unit does not require lubrication after initial assembly.

In operation of the mechanism, movement of the brake shoe 4 during braking causes the plunger 2 to be pressed inwardly of the housing 11 to exert a pull on the cable 6, which in turn pulls outwardly the pull rod 26 of the converter unit. The lever 25 is therefore pivoted (anticlockwise as viewed in FIGURE 4), against the action of spring 27, moving the pawl 24 to the right. If the brakes do not need adjustment, the total travel of the pawl will be less than the circumferential pitch of the ratchet teeth, so that when the brakes are released, the pawl will be returned (under the action of spring 27) into the tooth space which it occupied initially.

If, however adjustment is required to compensate for wear the pawl will pass over one tooth and engage in the next tooth space prior to the return movement, whereupon the ratchet wheel will be rotated and an adjustment effected.

The ramp 28 prevents over adjustment by deflecting the pawl out of engagement with the ratchet teeth if the pawl travel is excessive. This ensures that the pawl cannot pick up more than one new tooth on each braking operation causing adjustment. Also, when the adjuster is reset by manual rotation of the adjuster spindle, in the anticlockwise direction (FIGURE 4) the ramp again deflects the pawl to permit rotation of the ratchet wheel.

The above described mechanism will be seen to offer simplicity of construction and reliability in operation. By magnifying the brake shoe displacement, it is possible to give the ratchet teeth fairly large pitch, and lost motion arising out of manufacturing tolerances becomes unimportant.

Like the sensor unit, the converter unit could be modified in many ways. For example, the ratchet wheel could be indirectly coupled to the adjuster spindle by a suitable train, the last member of which would be keyed directly to the spindle. In such an arrangement, the pawl could be pivotally mounted directly on the pull rod 26. The adjuster spindle need not protrude through the back plate but could be mounted opposite a hole so as to be accessible through the backplate for manual adjustment.

Figure 7:
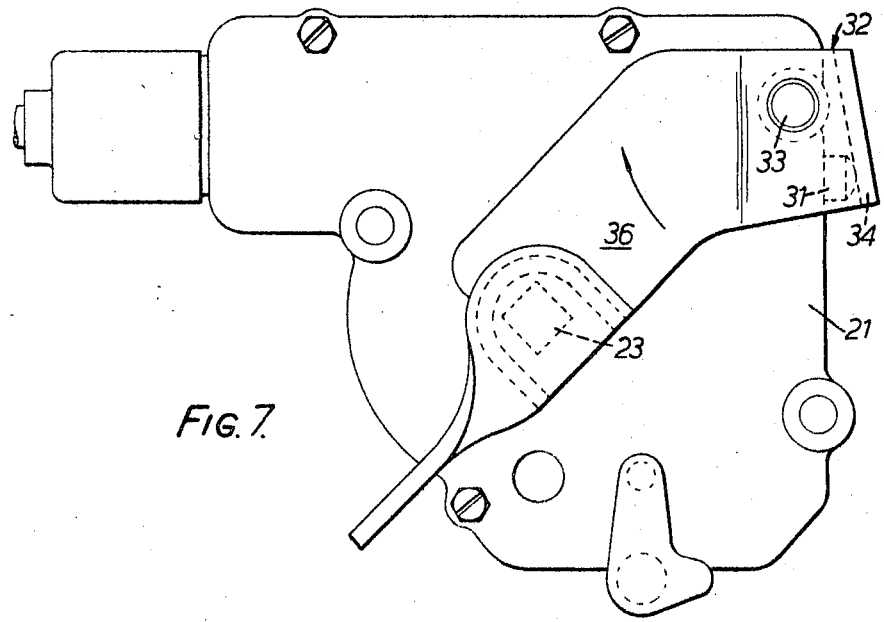
FIGURES 7 and 8 show a second form of converter unit in elevation and part sectional elevation, respectively.
Figure 8:
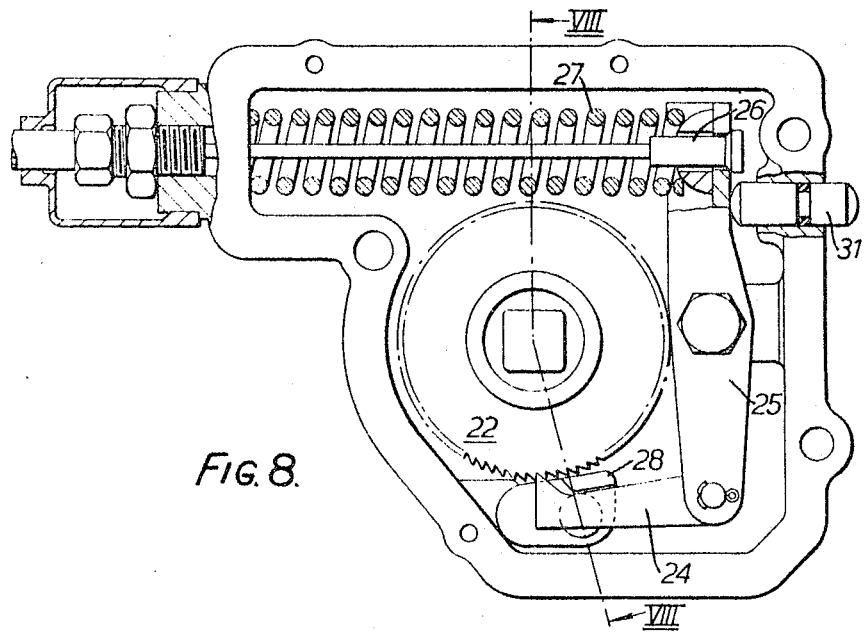
Figure 9:
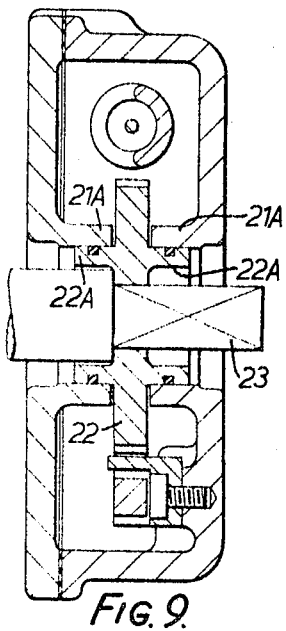
FIGURE 9 is a section on the line VIII—VIII of FIGURE 8.

The converter unit shown in FIGURES 7 to 9 is encased in a housing which is particularly suitable for convenient bolting directly on to the backplate of an existing brake, the ratchet wheel 22 being passed over and keyed to the standard spindle provided for manual adjustment. The casing of the converter unit is in two halves formed with tubular bosses 21A providing bearings for tubular projections 22A on the ratchet wheel 22, the projections being sealed in the bosses and rotatable therein. The squared outer end of the adjuster spindle 23 projects through the ratchet wheel and beyond the casing so as to be accessible for manual rotation as required.

The internal arrangement and operation of the converter unit is generally similar to that of FIGURE 4. However, a plunger 31 slidably mounted through the wall of the casing is manually operable to rock the lever 25 in order to disengage the pawl 24 from the ratchet wheel 22 when manual rotation of the spindle 23 is to be effected. To ensure that the pawl is disengaged before attempting manual rotation, a lever 32 is provided (see FIGURE 7), the lever being of channel cross-section and pivoted to the casing at 33. The web 34 of the lever engages the plunger 31 and one arm 36 of the lever normally covers the end of the spindle 23. When the lever is rocked clockwise to give access to the spindle, the web 34 presses the plunger 31 inwardly to disengage the pawl.

Figure 11:
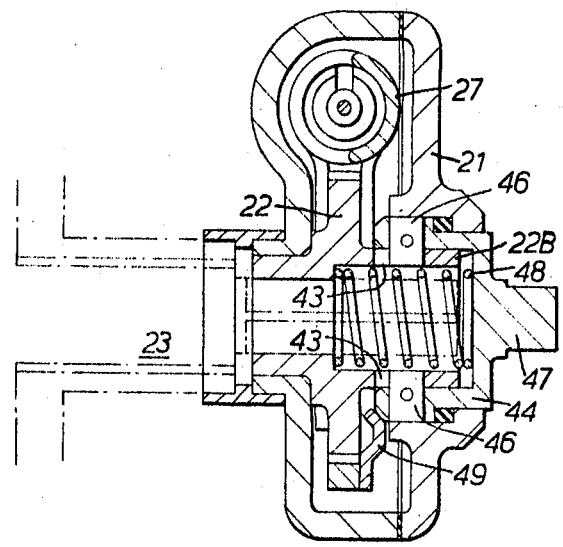
FIGURE 11 is a section on the line XI—XI of FIGURE 10.
Figure 10:
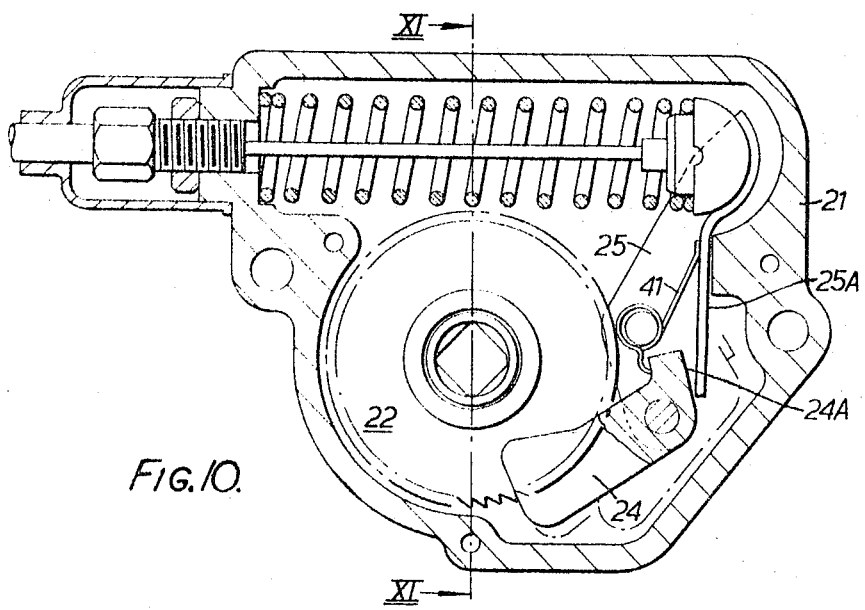
FIGURE 10 is a sectional elevation of a third form of converter unit.

In the converter unit of FIGURES 10 and 11, the lever 25 is of channel cross-section, between the limbs of which is pivotally mounted the pawl 24. A coil torsion spring 41 reacts against the base 25A of the channel and acts on a lug 24A on the pawl, thus biassing the pawl clockwise on the lever and into engagement with the ratchet wheel 22. As shown in FIGURE 10 there is initial clearance between the lug 24A and the base 25A. When, in use, the lever is rocked anticlockwise, the pawl can ride over one ratchet tooth, but its further angular displacement relative to the lever is limited by engagement of the lug 24A with the base 25A, thereafter, the pawl is carried out of engagement with the ratchet wheel by continued rotation of the lever 25, thereby prevented excessive adjustment on the return stroke.

In this embodiment, as shown in FIGURE 11, the adjuster spindle 23 terminates within the casing 21, so as not to be directly accessible by a spanner. Instead, the ratchet wheel 22 has an axially directed tubular extension 22 in which is formed a pair of matching helical slots 43, which is coupled to a rotatable cup 44 by a pair of pins 46 engaging in the slots. The cup is formed at its outer end with a squared head 47 accessible for manual rotation. The cup 44 is axially movable relative to the ratchet wheel 22 and casing 21, and is biassed outwardly, away from the ratchet wheel by a light coil compression spring 48. In normal operation of the converter, the cup rotates with the ratchet wheel, and similarly, rotation of the cup in one direction is transmitted to the ratchet wheel in a sense to take up the brakes without relative axial movement between the cup and ratchet wheel. However, reverse rotation of the cup for manual resetting of the brakes (e.g., when new shoes are to be fitted) causes the pins 46 to travel along the solts 43, so that the cup is displaced axially inwardly. This axial displacement of the cup causes it to move radially outwardly, a pawl follower 49 which in turn disengages the pawl from the ratchet wheel 22. When the pins reach the inner ends of the slots, a positive drive is transmitted through the ratchet wheel 22 to the spindle 23.

Figure 12:
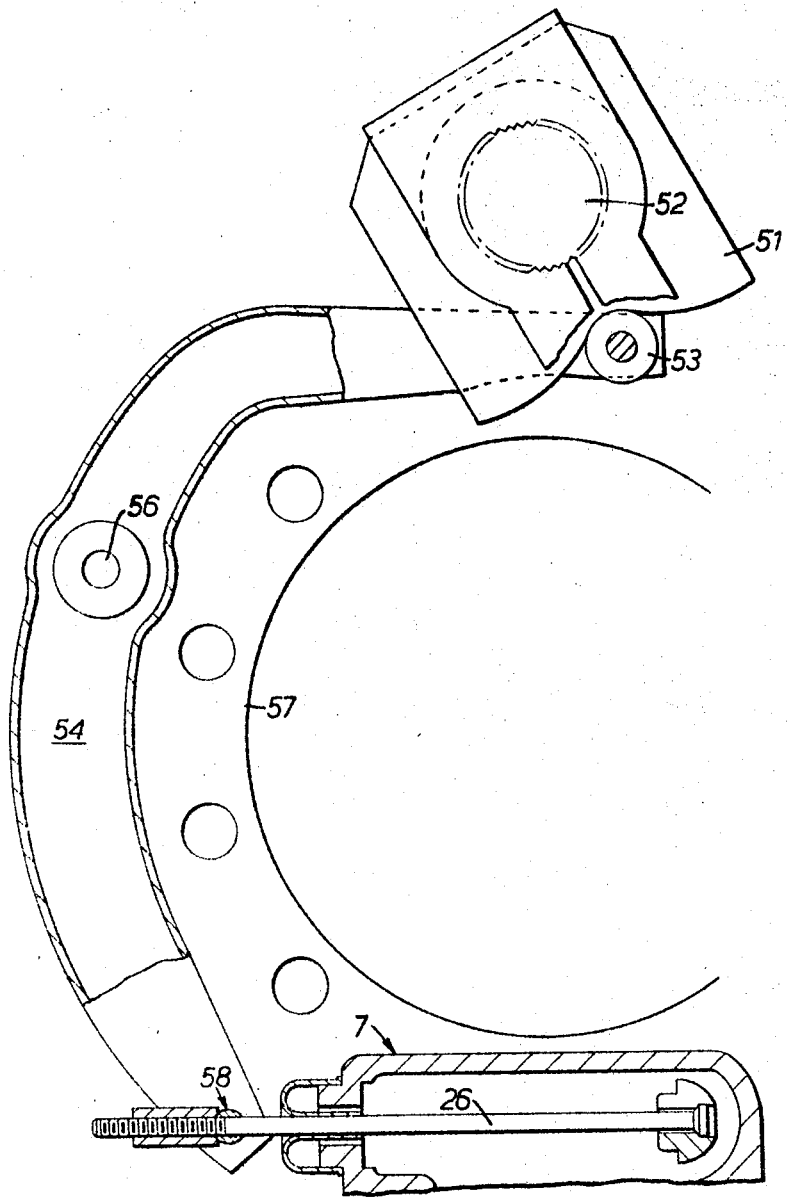
FIGURE 12 is an elevation showing another form of sensor and transmission means.

In the embodiment of FIGURE 12, the sensor unit comprises a cam 51 mounted directly upon a rotary brake-actuator 52 and cooperating with a cam-follower 53 carried on one end of a lever 54 pivotally connected intermediate its ends at 56 to the back plate 57 of the brake. The other end of the lever has a swivel connection 58 to a cable 26 providing the input to a converter unit 7 which may have any of the above described forms. The operative surface of the cam 51 is shaped symmetrically about its bottom dwell position, so that angular displacement of the cam in either direction upon brake actuation will produce clockwise rotation of the lever 54.

In each of the above described embodiments, the construction of the converter unit is such that the unit can conveniently be fitted to an existing brake, the ratchet wheel locating directly over the adjuster spindle of the existing brake, and being keyed to it for rotation therewith. This results in a relatively simple and compact arrangement, and yet the fact that the ratchet wheel is keyed to the spindle does not interfere with manual resetting or adjustment through the spindle, and there is no necessity to disengage the connection between the spindle and ratchet wheel for this purpise.

The invention could, of course, alternatively be embodied in arrangements in which the adjuster mechanism is incorporated in a brake on initial manufacture thereof, in which case the adjuster spindle need not be of standard form but could be specially designed to suit the particular assembly. Other constructional modifications will also be possible. For example, other forms of unidirectional drive means could replace the pawl and ratchet, and the converter units could be arranged to take up the clearance on brake application instead of during the return movement of the shoes.

I claim:

1. In or for a vehicle drum brake having a backplate, a pair of brake shoes movably mounted on said backplate and a manually rotatable spindle projecting through said backplate, an improved automatic adjuster mechanism comprising means for transmitting a drive in accordance with movement of a brake shoe, and a converter unit operable by said means to effect adjustment and having unidirectional drive means, a driven member of said drive means adapted to be keyed to said adjuster spindle for rotation therewith in both directions, and means for disengaging the drive means to facilitate manual rotation of said adjuster spindle.

2. The improved adjuster mechanism of claim 1, wherein said unidirectional drive means comprises a pawl and a ratchet wheel, said ratchet wheel constituting said driven member, and means for disengaging the pawl from the ratchet wheel for free manual rotation of said adjuster spindle in a direction opposite to that required for brake adjustment.

3. The improved adjuster mechanism of claim 2, comprising a rockable lever in said converter unit, a pivotal connection between said lever and said pawl, a drive connection from said drive means to said lever, and abutment means engageable by said pawl to disengage said pawl from said ratchet in response to excess travel of said lever.

4. The improved adjuster mechanism of claim 3, wherein said abutment means is stationarily mounted on a fixed part of said converter unit in the path of said pawl so as to deflect said pawl upon excess travel of said lever taking place.

5. The improved adjuster mechanism of claim 1, wherein said rocking lever is manually rockable to disengage said pawl prior to manual adjustment of said adjuster spindle.

6. The improved adjuster mechanism of claim 4, further comprising a manually operable lever normally preventing access to said adjuster spindle, said lever being manually movable to a position clear of said spindle and means responsive to movement of said manually operable lever clear of said spindle to effect excess movement of said rocking lever.

7. The improved adjuster mechanism of claim 3, comprising means mounting said pawl for limited angular adjustment relative to said lever as said lever rocks, said abutment means acting between said pawl and said lever to limit such angular adjustment, whereupon further movement of said lever carries said pawl clear of said ratchet wheel.

8. The improved adjuster mechanism of claim 3, comprising a manually rotatable member, pin and helical slot connection means coupling said manually rotatable member to said ratchet wheel whereby manual rotation of said member in one direction causes said member and said ratchet wheel to be relatively axially displaced, and means responsive to said axial displacement to disengage said pawl from said ratchet.

References Cited

UNITED STATES PATENTS

| | | | |
|---|---|---|---|
| 2,109,637 | 3/1938 | Gutkaiss | 188—196 |
| 2,132,576 | 10/1938 | Nachtwey | 188—79.5 |
| 3,121,478 | 2/1964 | Bostwick | 188—79.5 |
| 3,261,433 | 7/1966 | Page | 188—196 |

DUANE A. REGER, Primary Examiner

U.S. Cl. X.R.

188—196